(12) United States Patent
Terada et al.

(10) Patent No.: US 6,321,139 B1
(45) Date of Patent: Nov. 20, 2001

(54) OPERATION LINE SEARCHING METHOD AND ROBOT/SENSOR SYSTEM HAVING OPERATION LINE SEARCHING FUNCTION

(75) Inventors: Akihiro Terada, Fujiyoshida; Mitsuhiro Okuda, Oshino-mura, both of (JP)

(73) Assignee: Fanuc Ltd., Yamanashi (JP)

( * ) Notice: Subject to any disclaimer, the term of this patent is extended or adjusted under 35 U.S.C. 154(b) by 0 days.

(21) Appl. No.: 09/194,610

(22) PCT Filed: Mar. 30, 1998

(86) PCT No.: PCT/JP98/01447

§ 371 Date: Nov. 30, 1998

§ 102(e) Date: Nov. 30, 1998

(87) PCT Pub. No.: WO98/43785

PCT Pub. Date: Oct. 8, 1998

(30) Foreign Application Priority Data

Mar. 28, 1997 (JP) ................................ 9-092848

(51) Int. Cl.$^7$ ................................ G05B 19/418
(52) U.S. Cl. ............ 700/248; 700/245; 700/249; 700/252; 700/254; 700/255; 700/258; 700/259; 701/29; 219/124.34
(58) Field of Search ................... 700/248, 245, 700/249, 255, 264, 116, 187, 251, 254, 258, 259, 193, 252; 701/29; 228/102; 414/744.8, 591, 792; 219/124.34

(56) References Cited

U.S. PATENT DOCUMENTS

| | | | |
|---|---|---|---|
| 4,639,878 | * 1/1987 | Day et al. | 700/259 |
| 4,998,050 | * 3/1991 | Nishiyama et al. | 700/248 |
| 5,111,401 | * 5/1992 | Everett, Jr. et al. | 701/24 |
| 5,297,238 | * 3/1994 | Wang et al. | 700/259 |
| 5,347,463 | * 9/1994 | Nakamura et al. | 700/226 |
| 5,429,682 | * 7/1995 | Harlow, Jr. et al. | 118/681 |
| 5,544,282 | * 8/1996 | Chen et al. | 700/255 |
| 5,582,750 | * 12/1996 | Hamura et al. | 219/124 |
| 5,645,884 | * 7/1997 | Harlow, Jr. et al. | 427/8 |
| 5,798,627 | * 8/1998 | Gilliland et al. | 318/568.14 |

FOREIGN PATENT DOCUMENTS

| | | |
|---|---|---|
| 59-216006 | 12/1984 | (JP) . |
| 64-21304 | 1/1989 | (JP) . |
| 2-224989 | 9/1990 | (JP) . |
| 7-332927 | 12/1995 | (JP) . |
| 8-39470 | 2/1996 | (JP) . |

OTHER PUBLICATIONS

Ishii, A robot teaching method using Hyper Card system, 1992, IEEE, pp. 410–412.*
Lin et al., A decentralized cooperation protocol for autonomous robotic agents, 1995, IEEE, pp. 420–426.*
Klomp et al, Tactile Sensing In Fine Motion Robot Tasks, IEEE., pp. 66–70, 1992.*

* cited by examiner

Primary Examiner—William A. Cuchlinski, Jr.
Assistant Examiner—McDieunel Marc
(74) Attorney, Agent, or Firm—Staas & Halsey LLP

(57) ABSTRACT

An operation line searching method in which an operation start position is automatically approached and a robot/sensor system having such function of detecting the operation line. A robot having a laser sensor and an operation tool attached to a distal end thereof approaches an operation start position Q1 using various searching motion path patterns (a) to (d). Pattern (a) is determined to avoid an obstacle F or an obstructively-shaped portion G. The path thereof, for example, can be determined by specifying a coordinate axis of a coordinate system w. Patterns (b) and (c) are carried out by teaching, to the robot, data for determining the paths thereof in order. Pattern (d) is carried out in the following manner: an initial parameter <V1>, an angle of rotation and a norm increase factor are specified as parameters, and at the time when incremental travel quantity of a (i+1)th occurrence (i=0, 1, 2, . . . ) Should be obtained, it is obtained by calculating <Vi+1>−<Vi>, where the vector <Vi+1> is obtained from the last obtained vector <Vi>based on the illustrated relationship (the angle of rotation and the norm growth factor).

18 Claims, 7 Drawing Sheets

OPERATION LINE SEARCHING METHOD AND ROBOT/SENSOR SYSTEM HAVING OPERATION LINE SEARCHING FUNCTION

BACKGROUND OF THE INVENTION

1. Field of the Invention

The present invention relates to a method of detecting a position of an operation line when starting tracking of the operation line using a robot/sensor system in which an operation line on an object is detected by a sensor so as to perform a predetermined operation by moving a tool along the detected operation line, and also relates a robot/sensor system with such detecting function. The present invention is applicable to a robot/laser sensor system for performing various operations such as arc welding, deburring and sealing.

2. Description of Related Art

A technique of operating a robot to move along an operation line such as a weld line while sensing a position of the operation line in advance using a laser sensor mounted on the robot is applied to various robot operations including a welding operation as a real-time tracking technique, the robot having a tool such as an arc welding torch attached to a distal end thereof. This technique enables the robot to move along an actual operation line even when individual objects of operation (for example, fillet welding workpieces) are not positioned precisely. Thus, the technique is widely used as means for improving operation accuracy.

FIG. 1 is a schematic perspective view showing an example of an arrangement of a robot/laser sensor system performing an arc welding on a corner portion WD formed by fillet welding workpieces W1 and W2. As shown in FIG. 1, a welding torch 2 as an operation tool and a laser sensor (a body thereof) 10 are attached to a robot 1 (only a distal portion thereof is shown). The laser sensor 10 scans for sensing surfaces of the workpieces W1 and W2 with a laser beam 4. In the following description, it is supposed that a point 3 representing the position of the robot agrees with an distal end of the tool.

Sign Q0 indicates an initial position of the robot 1, P1 a welding start point which is taught, and P2 a welding end point which is taught. In general cases where positioning of the objects of operation, for example, such as the workpieces W1, W2 to be jointed by welding is not so precise, an actual start point Q1 of the corner portion 4 does not necessarily agree with the taught welding start point P1.

When the robot 1 starts regenerative operation, the robot starts to move the tool tip 3 from the initial position Q0 to the taught point P1, and the laser sensor 10 is turned on to start sensing. Around the time when the tool tip 3 reaches the taught point P1, the laser beam 4 starts to scan the surfaces of the workpieces W1 and W2 to be welded in such a manner as crossing the weld line (corner line) WD to thereby detect the position of the point Q1 on the weld line WD.

Then, after correcting its position to the point Q1, the robot 1 moves along the weld line WD by known real-time tracking. The torch 2 is ignited at an appropriately determined point of time, and welding is performed from the point Q1 to the point Q2. Also when applied to operation other than welding, the robot is guided to the operation start point Q1 by a similar manner of approach, and starts to move along the operation line (a deburring line, a sealing line and the like).

In order that the operation as described above can be started and performed smoothly, it is necessary that positioning of the workpieces W1 and W2 to be welded (objects of operation) be performed with relatively high accuracy (relatively small error) with respect to the range of scanning by the laser beam 4. Since the laser sensor 10 is primarily a sensor for narrow-range sensing, the range of scanning by the laser beam 4 cannot be considered a large one. Therefore, if the positioning of the workpieces W1 and W2 to be welded (objects of operation) is not accurate adequately, there is a possibility that the weld line (operation line) WD cannot be detected.

The most popular method which has been conventionally adopted to deal with this problem is outputting an alarm signal to stop operation if an operation line is not detected within a predetermined time, or before the robot travels a predetermined distance. Such method, however, is one of the causes of drop of operation efficiency.

Another method proposed is designed so that the robot is made to retry its operation when an operation line cannot be detected. The problem is that such method is burdensome since it needs preparation of complicated programs.

Further, in conventional methods, the probability of false detection is high, if an obstacle F (external to the objects of operation) or an obstructively-shaped portion G (belonging to the objects of operation) which hinders normal detection of a position of the operation line lies in the vicinity of the operation start point Q1 and if the objects of operation W1 and W2 are erroneously positioned, causing the taught point P1 to become closer than a normal position to the obstructively-shaped portion G.

SUMMARY

A first object of the present invention is to improve a robot/laser sensor system having a laser sensor for detecting an operation line so that searching motion for finding the position of an operation line can be performed in a rationalized manner and that, even if positioning of objects of operation is not performed with high precision, the position of the operation line can be detected with high precision and intended an operation can be started.

A second object of the present invention is to increase the possibility of unhindered approach to the work even if an obstacle or a portion of work having an obstructive shape which hinders normal detection of the position of the operation line lies in the vicinity of an operation start point, by avoiding such obstacle or obstructive portion of work.

The present invention is an improvement of a method of searching an operation line in performing a predetermined operation by moving a tool supported by a robot along the operation line based on a signal outputted from a sensor using a robot/sensor system having the robot, a robot controller and the sensor mounted on the robot for detecting the operation line of an object of operation.

The method of the present invention includes the steps of: determining a search motion for finding a position of the operation line using the sensor by moving the tool closer to a predetermined start position of operation, to include a component of motion in a direction crossing an extending direction of the operation line in the vicinity of the start point of the operation line; starting the determined search motion; and terminating the search motion when the sensor detects a shaping element of the object of operation during the search motion, said shaping element defining the operation line. The robot/sensor system of the present invention has means for performing the above steps.

In a preferred embodiment of the present invention, a plurality of searching motion path patterns, each having in the vicinity of the start point of the operation line a component of motion in a direction crossing an extending direction of the operation line, are provided in advance, and one search motion path pattern is selected from these searching motion path patterns.

The following methods can be adopted for determining the search motion, (I) the search motion is determined by relating the search motion to the direction of a coordinate axis of a coordinate system specified for the robot; (II) the search motion is determined by teaching the robot; and (III) the search motion is determined based on predetermined calculation using parameters which are provided in advance for the robot/sensor system to describe the path patterns

BRIEF DESCRIPTION OF DRAWINGS

FIG. 8a shows a pattern by which approach is made by moving in one direction, FIG. 8b a pattern by which approach is made by moving in two directions, FIG. 8c a pattern by which approach is made by moving from an initial position to an operation start point Q1 along a curved path, and FIG. 8d a pattern by which approach is made along a spirally curved path.

DETAILED DESCRIPTION OF THE INVENTION

Figure 1:
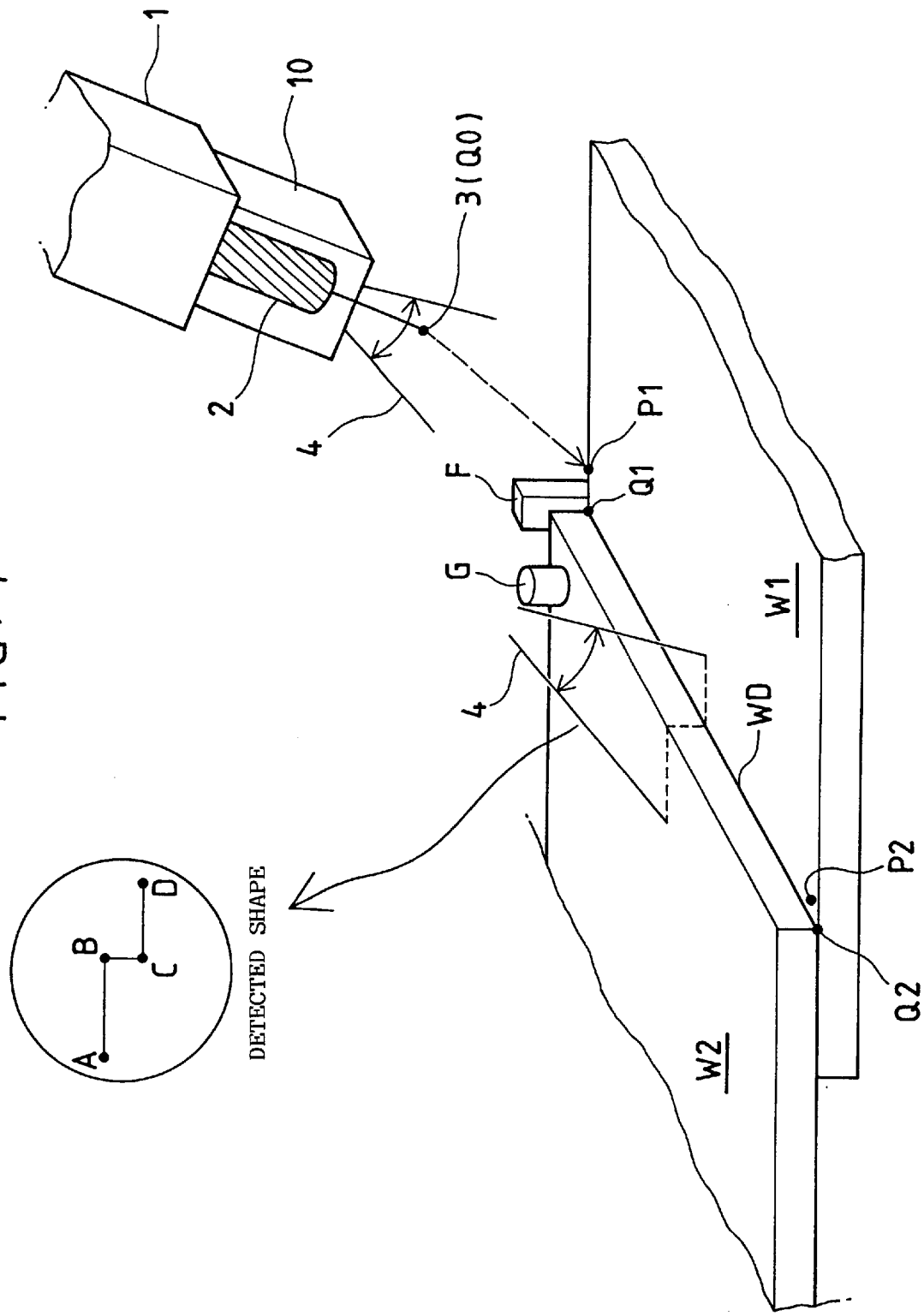
FIG. 1 is a schematic diagram showing a general arrangement in performing a welding operation using a robot/laser sensor system.

The present invention will be explained below further in detail with respect to a case in which the invention is applied to a robot/sensor system for performing an arc welding operation with an arrangement shown in FIG. 1. The above description on FIG. 1 holds in the present embodiment except for the matters related to the approach to the operation start point Q1.

A robot 1 of the robot/sensor system for performing an arc welding operation on a corner portion WD formed by workpieces W1 and W2 to be subjected to fillet welding, has a torch 2 as an operation tool and a laser sensor 10 at a distal end thereof. The laser sensor 10 scans and senses, by a laser beam 4, the side to which the robot is to move with respect to a torch tip 3, the torch tip 3 being an operation point and also the distal end of the tool.

Sign Q0 denotes an initial position of the robot 1, P1 a welding start point which is taught, and P2 a welding end point which is taught. The positioning accuracy of the objects of operation, that is, the workpieces W1 and W2 to be welded is allowed to be considerably lower than that required in conventional cases. As described later, in the system according to the present invention, a method differing from that in conventional cases is adopted as to motion during which the tool tip 3 of the robot 1 move from the initial position Q0 until it comes in the vicinity of the welding start point Q1.

After arriving in the vicinity of the point Q1, the robot 1 is made to move along the weld line WD by real-time tracking as in conventional cases. The torch 2 is ignited at an appropriately determined point of time, and welding is performed from the point Q1 to the point Q2. The welding end point Q2 can be detected by the laser sensor 10.

Figure 2:
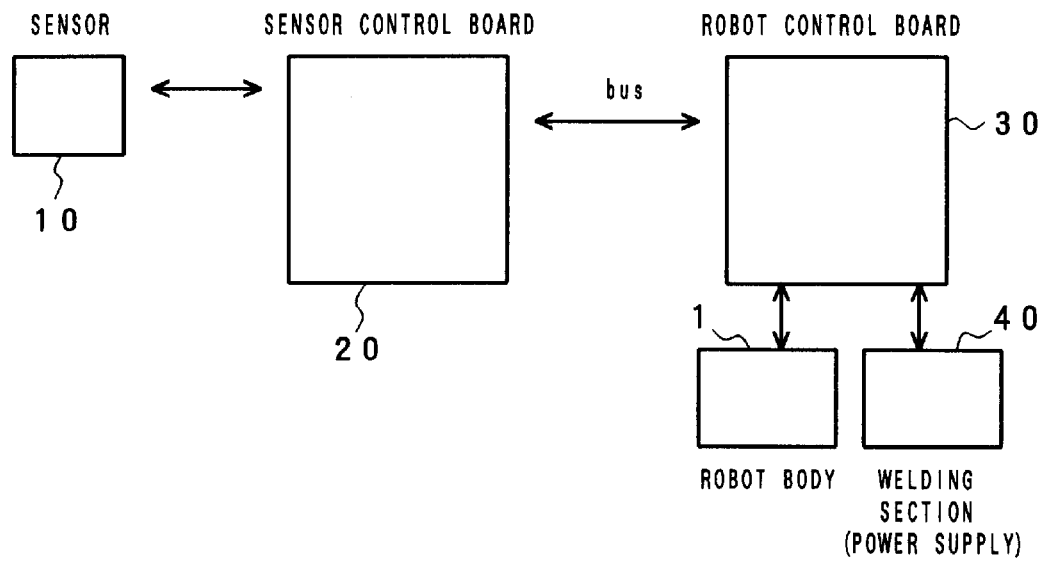
FIG. 2 is a block diagram generally showing a system arrangement of the robot/laser sensor system used in the arrangement shown in FIG. 1.

FIG. 2 is a block diagram schematically showing the system structure of the robot/laser sensor system used in the arrangement shown in FIG. 1. The system of the present embodiment comprises a sensor body 10 and a sensor board 20, which constitute the laser sensor, a robot control board 30, which functions also as a control section for the entire system, a robot body (mechanical part) 1 and a welding section (power supply device) 40. The sensor board 20 and the robot control board 30 are connected by a bus. Though the structure of each part of the system is known, a brief explanation will be given with reference to FIGS. 3 to 5.

Figure 4:
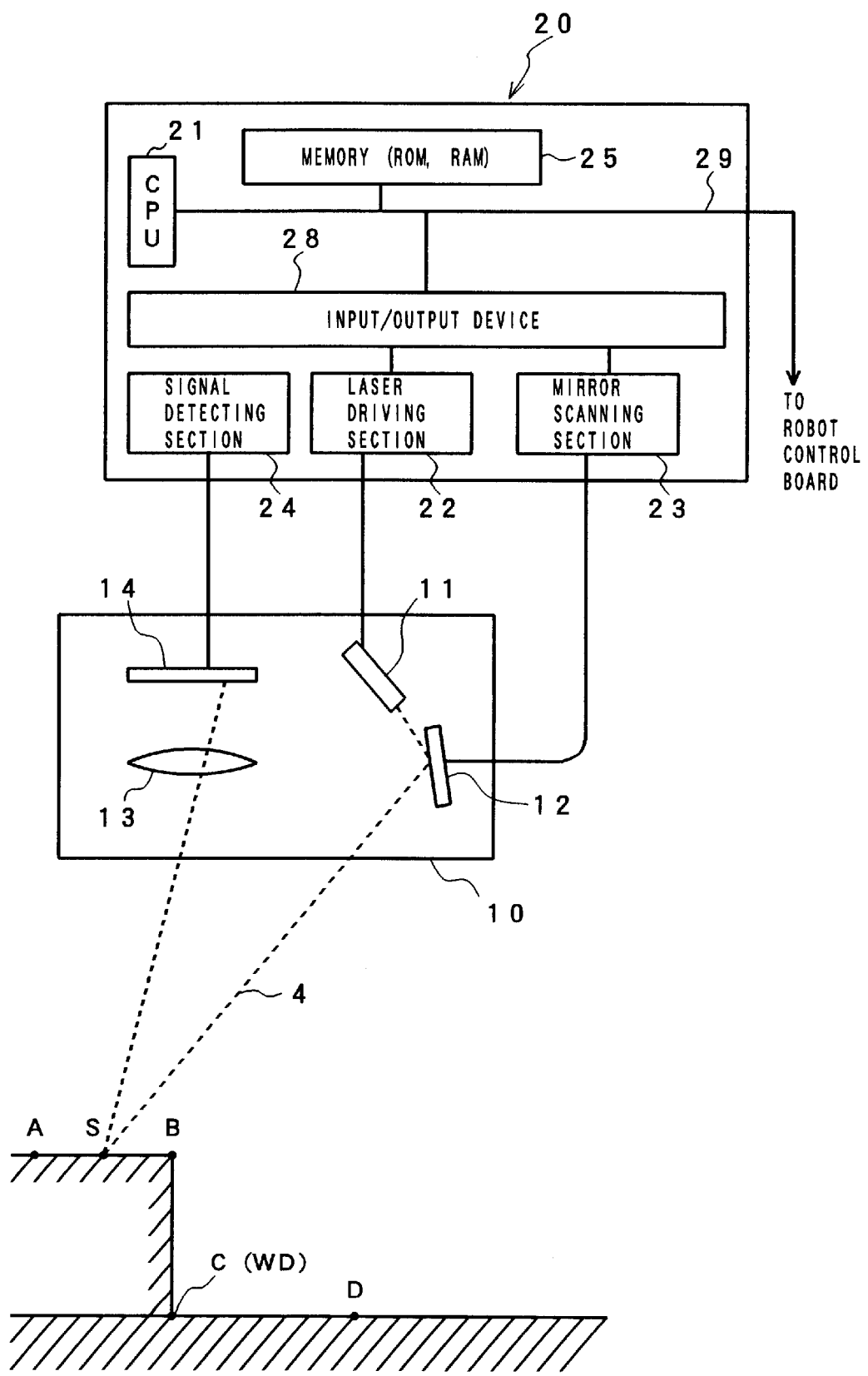
FIG. 4 is a diagram showing an example of structure of a laser sensor.

FIG. 4 is an illustration schematically showing an example of the structure of the laser sensor. The laser sensor includes of the sensor body 10 and the sensor board 20. The sensor body 10 includes a laser generator 11 and an oscillating mirror (galvanometer) 12 for beam scanning. A light detecting section has an optical system 13 for imaging and a light receiving element 14.

The sensor board 20 has a CPU 21 which is a micro processor. To the CPU 21 are connected, through a bus 29, an input/output device 28 and a memory 25 which is constituted of a ROM, a RAM and the like.

To the input/output device 28 are connected a laser driving section 22 for driving the laser generator 11 to generate a laser beam, a mirror scanning section 23 for oscillating the oscillating mirror 13, and a signal detecting section 24 for detecting the position of a reflection point S of a scanning beam based on the position where light is received by the light receiving element 14. The bus 29, which is connected to a CPU provided in the robot control board 30 (see FIG. 5), connects the sensor board 20 and the robot control board 30.

Receiving a laser sensor start command from the robot control board 30, the CPU 21 starts a laser sensor drive program stored in the memory 25, transmits a laser drive command to the laser driving section 22, and transmits a mirror scan command to the mirror scanning section 23. Thus, an object to be examined is scanned by the laser beam 4.

The laser beam which is diffuse-reflected at the reflection point S on the surface of the object forms an image on the light receiving element 14 by the optical system 13, corresponding to the position of the reflection point S. As the light receiving element, a CCD (Charge Coupled Device) which is a split type element, a PSD (Position Sensitive Detector) which is a non-split-integral type element, or the like is used. Here, a one-dimensional CCD array for laser sensor is used as the light receiving element 14. (A two-dimensional array may be used instead.)

Light impinging on the light receiving surface of the light receiving element 14 (an image formed by reflected light) is converted in photoelectrons and stored in cells of the light receiving element 14. Electric charge stored in the cells is outputted in accordance with a CCD scan signal coming from the signal detecting section 24, starting from the cell at one end, one by one in each predetermined period, and undergoes, through the signal detecting section 24 and the input/output device 28, processing such as analog-digital conversion, whereby the latest data is stored in the memory 25 in order.

The period for scanning the CCD is set to be adequately shorter than the period of oscillation of the oscillating mirror 12 for scanning (for example, the former is one several-hundredths of the latter), and it is arranged that change of the oscillation angle of the oscillating mirror 12 and change of the output state of the CCD element can be measured at any time. The output state of the CCD element is measured in the form of a position (cell number) of a cell having the largest output, by detecting the position of a cell on which the light coming from the reflection point S falls. Based on this position, the sensor calculates the position of the reflection point S. Thus, a large number of points to be detected are distributed at small intervals in the range extending from A to D, corresponding to the range of scanning by the laser beam 4.

Figure 3:
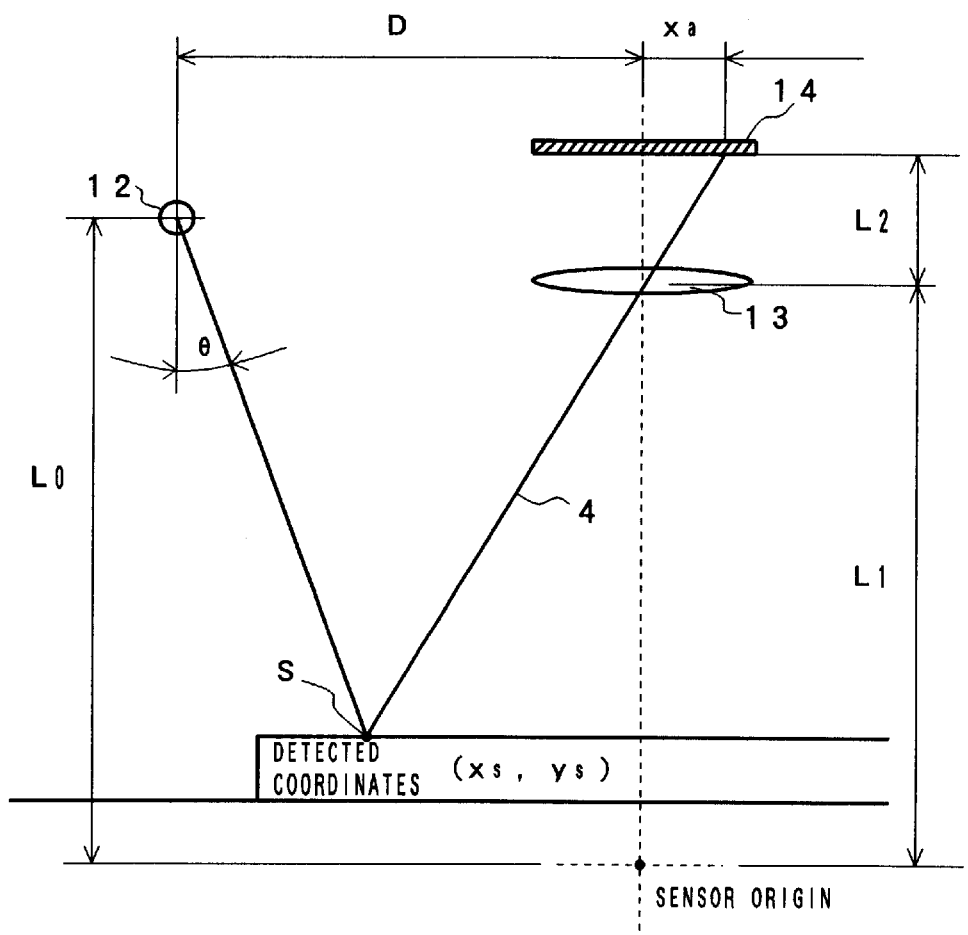
FIG. 3 is a diagram showing a principle of position measurement by a laser sensor.

FIG. 3 is a diagram illustrating the principle for obtaining the coordinates (Xs, Ys) of the reflection point S based on the position xa detected by the light receiving element 14. The sensor origin (0, 0) is on a line connecting the center of the optical system 13 and the central point of the light receiving element 14, the line being used as Ys coordinate axis, and a line perpendicularly intersecting the Ys coordinate axis is used as Xs coordinate axis.

L1 denotes the distance from the origin to the center of the optical system, L2 the distance from the center of the optical system to the central point of the light receiving element 14, D the distance in the Xs coordinate axis direction from the sensor origin to the center of oscillation of the oscillating mirror 12, L0 the distance in the Ys coordinate axis direction from the sensor origin to the center of oscillation of the oscillating mirror, θ the angle of the laser beam 4, having been reflected by the oscillating mirror 12, to the Ys coordinate axis direction, and xa the position where the light is received on the light receiving element 14. In this case, the coordinates (xs, ys) of the reflection point S of the laser beam 5 in the sensor coordinate system can be calculated using the following expressions (1) and (2):

$$xs = xa \cdot ((L1-L0) - \tan\theta + D)/(xa + L2 \cdot \tan\theta) \quad (1)$$

$$Ys = (L1 \cdot xa + L2(L0 \cdot \tan\theta - D))/(xa + L2 \cdot \tan\theta) \quad (2)$$

The CPU 21 in the sensor board 20 starts a position calculation program stored in the memory 25, in accordance with a command outputted from the robot control board, and performs, in each predetermined period, processing corresponding to the calculation by the expressions (1) and (2). The result of the calculation is stored in the memory, 25 in order. On the other hand, sensor position data is transmitted from the robot control board 30 through the bus 29 in each predetermined period. Both data (sensor data representing the position of the reflection point S and sensor position data) are correlated with each other by comparing and referring to each other points of time when each data is written, and the position of the reflection point S in the robot coordinate system is calculated. The result of the calculation is stored in the memory 25 in order. When data on the reflection point S is not obtained, code data indicating it is written instead.

Figure 5:
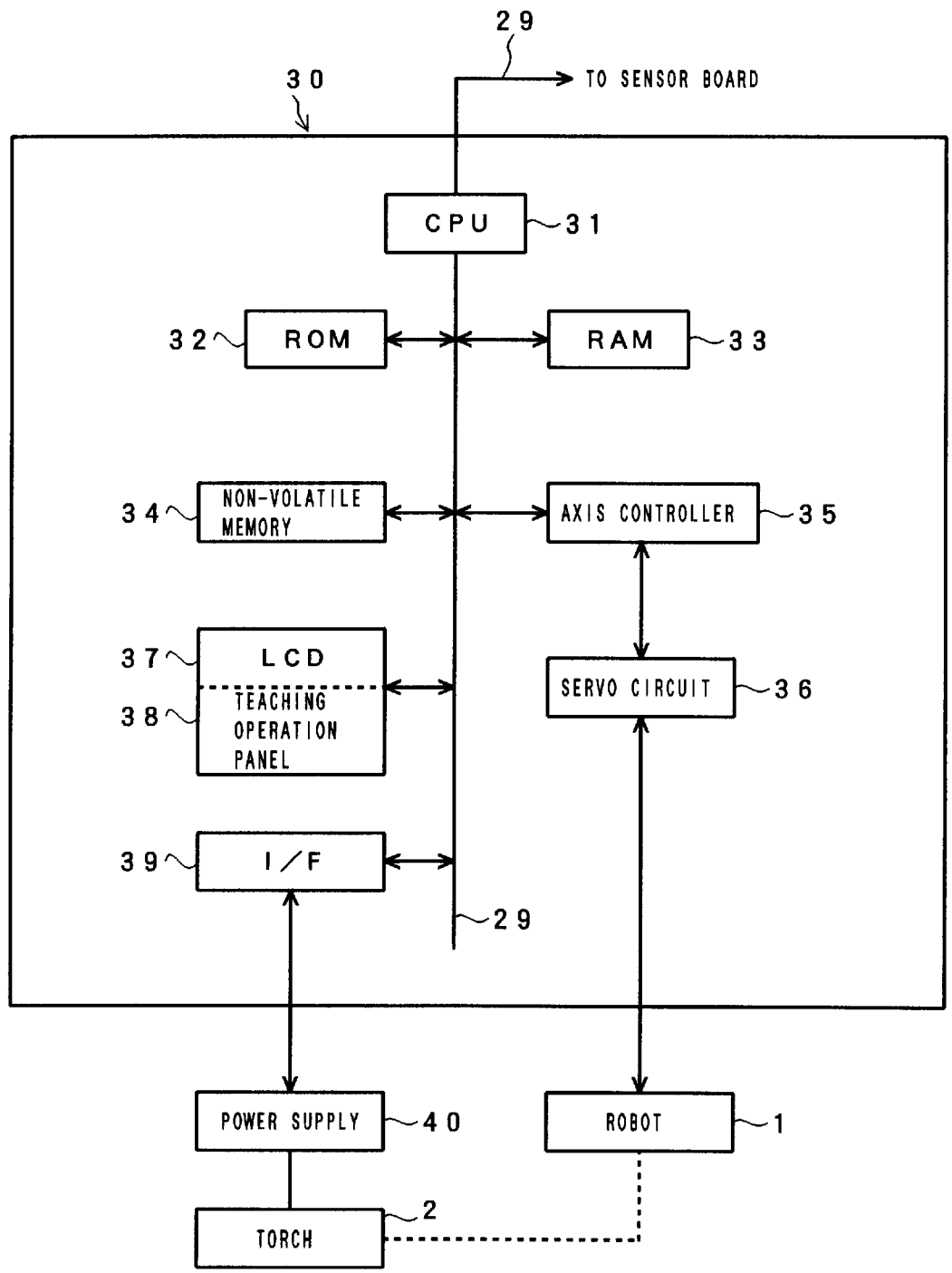
FIG. 5 is a block diagram showing main structure of a robot control board and its connection to a robot body and a power-supply constituting a welding section.

FIG. 5 is a block diagram schematically showing the principal structure of the robot control board 30 and connection of the robot control board 30 to the robot body 1 and a power supply device 40 which constitutes a welding section. As shown in FIG. 5, the robot control board 30 has a CPU 31 includes a micro processor. The CPU 31 is connected through the bus 29 to the above mentioned CPU 21 in the sensor board 20.

The CPU 31 is also connected, through the same bus 29, with a memory 32 which is a ROM, a memory 33 being a RAM, a nonvolatile memory 34, a teaching operating panel 38 having a crystal display 37, axes controllers 35 being connected through servo circuits 36 to a welding robot (mechanical body) 1, and a general purpose interface 39 being connected to the power supply device 40 for welding.

In the ROM 32, a system program is stored for controlling the entire system including sections or parts of the sensor control board 20 and the robot control board 30, the robot body 1 and the power supply device 40. The RAM 34 is a memory used for temporarily storing data and for calculation. In the non-volatile memory 34 are stored various set parameter values and programs for commanding the operation of the system including the robot body 1.

The above described structure and functions are conventionally known. Further, in the present embodiment, data and programs for determining the operation for detecting the position of a weld line are stored in the non-volatile memory 34 and the ROM 33. The content of processing based on such data and programs is somewhat different depending on the method of determining the operation for detecting the weld line position. Next, the operation for detecting for the weld line position will be described, taking three examples of the method for determining the searching motion.

Figure 6:
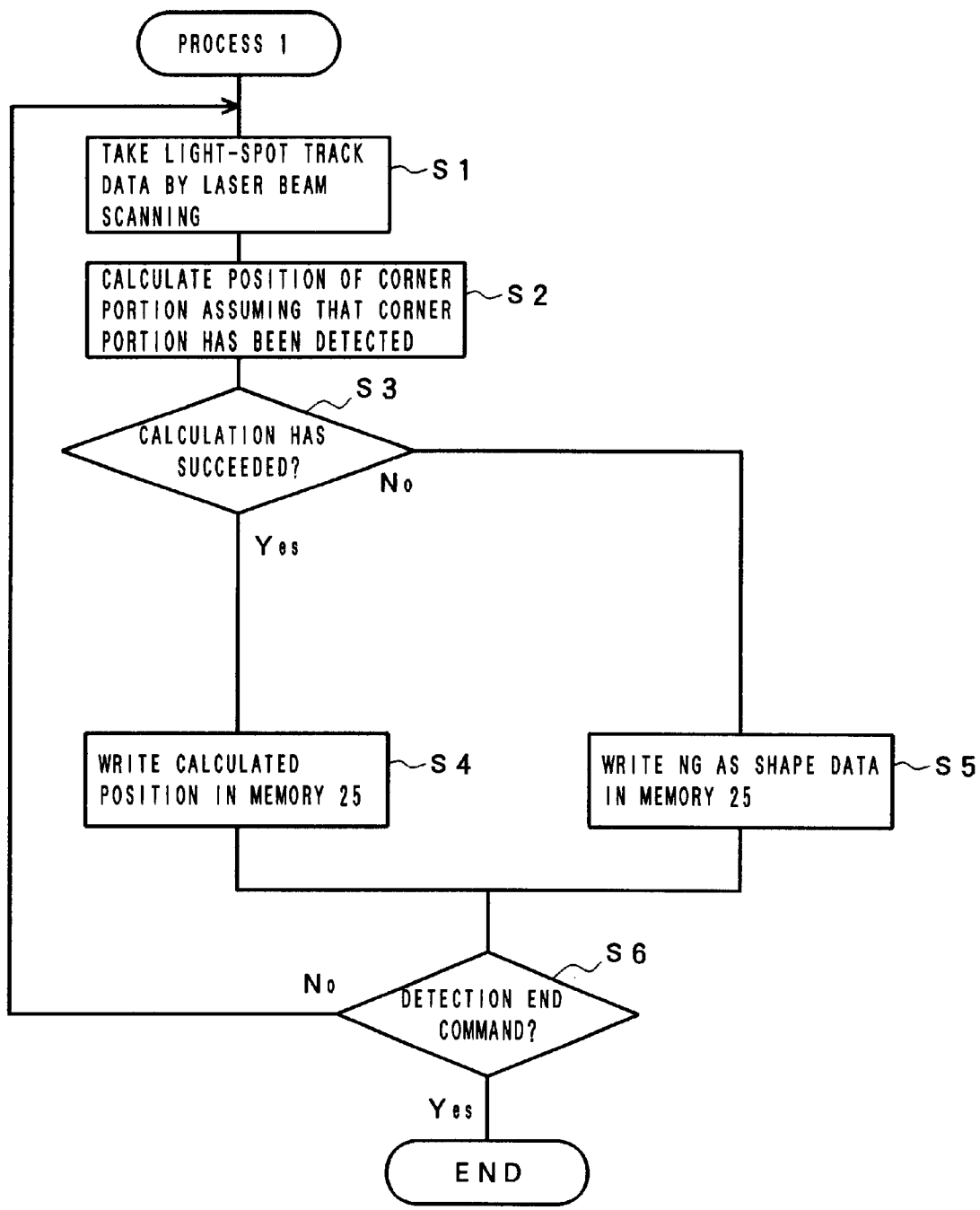
FIG. 6 is a flowchart of process 1 to be performed in a sensor board.

FIG. 6 is a flowchart schematically showing process 1 performed in the sensor board 20 of the laser sensor. The process 1 is common to the above mentioned three methods. The essential point of each step is as described below. The process 1 is started when a detection start command is received from the robot control sensor.

Step S1; Data representing a track of the light spot (reflection point) is taken in by laser beam scanning. If the reflection point does not exist, code data representing it is taken instead.

Step S2; Based on the supposition that the corner portion formed by the workpieces W1 and W2 to be welded have been detected, calculation of the position of the corner portion is tried.

Step S3; If the calculation of the position of the corner portion formed by workpieces W1 and W2 has been made, the procedure proceeds to Step S4. If not, the procedure proceeds to Step S5. The calculation can be made when normal data, not NG data, is obtained on the workpieces W1 and W2 to be welded and both a corner point B and the corner portion C (see FIGS. 1 and 4) can be calculated. Therefore, determination for "NO" is outputted each time, until the scanning by the laser beam 4 becomes to run across the corner point B and the corner portion C.

Step S4; The calculated position of the corner portion is written in the memory 25.

Step S5; NG data indicating that the calculation of the position of the corner portion cannot be made is written in the memory 25.

Step S6; As long as a detection end command is not received from the robot control board, the processing returns to Step S1 to repeat the above processing cycle.

Figure 7:
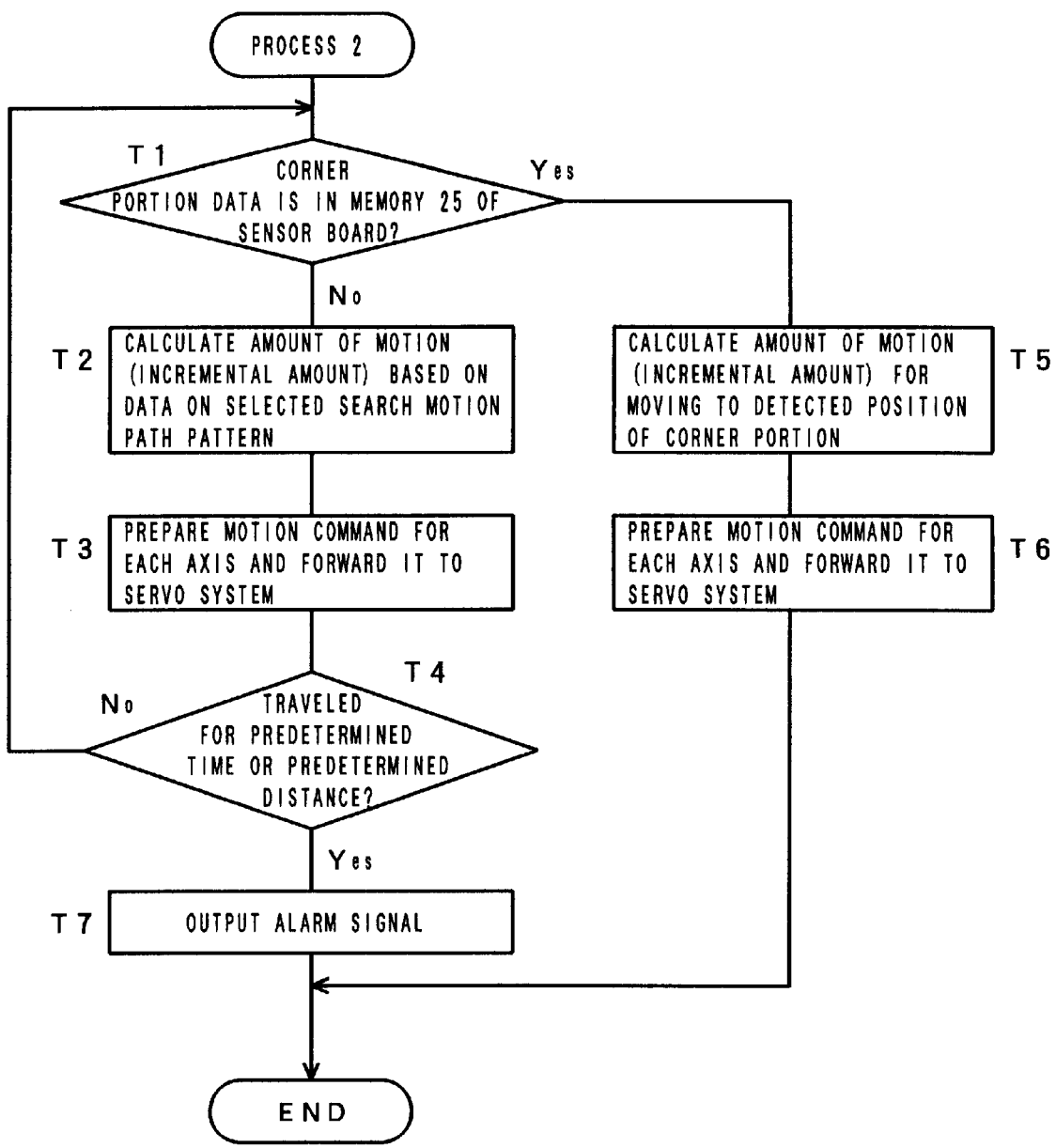
FIG. 7 is a flowchart of process 1 to be performed in a robot control board.

On the other hand, process 2 schematically shown by a flowchart of FIG. 7 is performed in the robot control board 30. The process 2 is common to the above mentioned three methods, except Step T2. The content of each Step is as described below. The process 2 is performed so that the operation of the robot 1 in a first operating section of its regenerative operation, starting from the initial position Q0, is made an operation line search motion.

Step T1; It is checked whether the corner portion data, not the NG data, is written in the memory 25 of the sensor board 20. If the corner portion data is written, the processing proceeds to Step S5. If not, the processing proceeds to Step T2. It is to be noted that determination for "NO" is outputted each time, until the scanning by the laser beam 4 becomes to run across the corner point B and the corner portion C.

Step T2; An amount of movement (incremental quantity) is calculated based on data concerning a selected searching motion path pattern. The method of calculation is somewhat different depending on the above mentioned three methods of determination, as described later.

Step T3; Based on the amount of movement (incremental quantity) calculated in Step T2, a motion command for each axis is prepared and output to the servo motor.

Step T4; It is checked whether the robot is making detection within the allowed range or not is, for example, by comparing running time or a travel distance from the start of searching motion with corresponding limit value. If the detection is performed out of the normal range, the processing proceeds to Step T7. If it is within the normal range, the processing returns to Step T1 to start the next processing cycle.

Step T5; A necessary amount of movement (incremental quantity) is calculated based on the corner portion data detected by the laser sensor (which has been converted into robot data in the sensor board or in the robot control board). It is to be noted that the corner portion first detected by the laser sensor is in the vicinity of the welding start point Q1. (The position of the first detected portion may somewhat vary depending on the searching motion path pattern.)

Step T6; Based on the amount of movement (incremental quantity) calculated in Step T5, a motion command for each axis is created and output to the servo motor to terminate processing for deleting operation.

FIGS. 8a to 8d show examples of selectable search motion path patterns.

Pattern (a); This is suitable, for example, for cases where an obstacle F or an obstructively-shaped portion lies on one side of the weld line WD. In this pattern, the initial position (or, in some cases, an on-route position) is selected on the side suitable for approach, and approach to the vicinity of the operation start point (welding start point) Q1 is made by moving, from the selected position, in one direction which crosses, at an appropriate angle, the direction in which the operation line is supposed to extend.

Figure 8A:
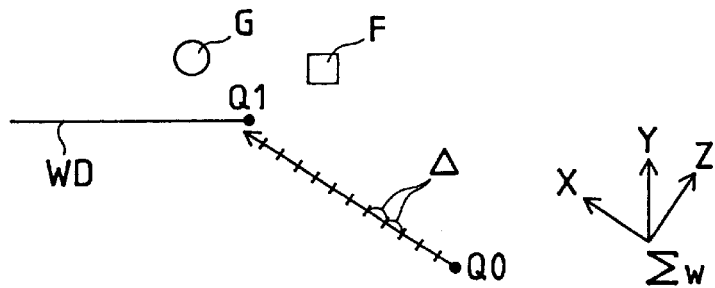
FIGS. 8a–8d show examples of selectable search motion path patterns.
Figure 8B:
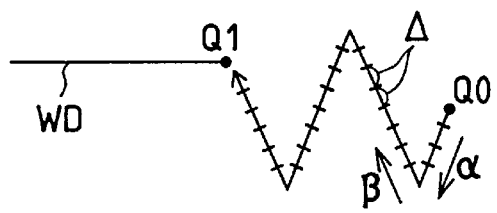
Figure 8C:
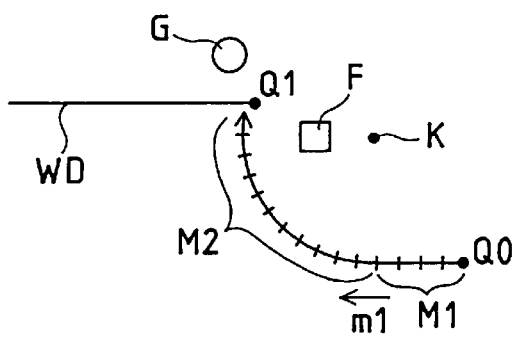
Figure 8D:
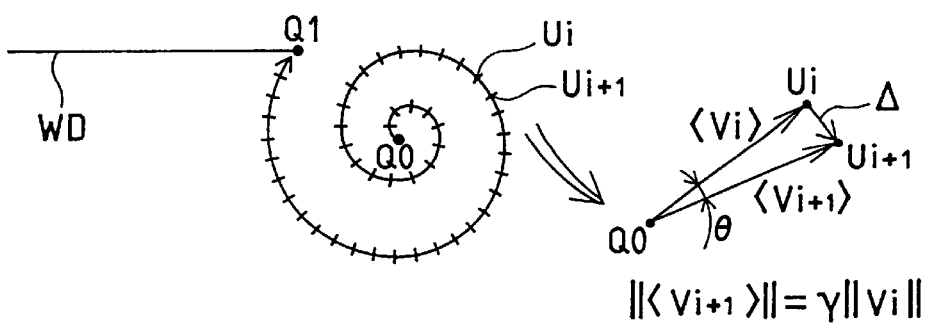

The path of this pattern, for example, can be determined by the above mentioned method I by relating it to the directions of coordinate axes of a coordinate system specified for the robot. Specifically, as shown in FIG. 8a, an axis (X-axis and the like) of a coordinate system Σw established corresponding to an approach path, and a travel direction is determined based on data for establishing the coordinate system Σw. An amount of movement Δ is determined based on a parameter of an incremental amount of movement, which is determined independently, and this amount of movement is treated as the amount of the movement to be calculated in Step T3.

Other methods II (the path is determined by teaching the robot) and III are also applicable. For example, in the method II, a travel direction and an incremental amount of movement Δ are directly taught to the robot.

Pattern (b); In pattern (b), approach is made from two directions. This is the searching motion path pattern suitable, for example, for application to the case where positioning entails considerable variations and the initial position is selected to correspond to about the medium of the variations.

The path of the pattern (b) can be determined, for example, by the above mentioned method II. Specifically, two travel directions $\alpha$ and $\beta$, an incremental travel quantity Δ, and n, the number of times of repetitions of incremental movements in each of travel directions $\alpha$ and $\beta$ are taught. It is to be noted that, in the illustration, the n, the number of times of incremental movement, are given as three, six, six, . . . Actual incremental travel quantity Δ, however, is very small, so that the actually taught number of times n is far larger.

Pattern (c); This is suitable, for example, in a case where obstacles F or obstructively-shaped portions exist both on one side of the operation line WD or in the vicinity of the front end of the operation line WD. In this pattern, the initial position (or, in some cases, an on-route position) is selected on the side suitable for approach, and approach is made by moving from the thus selected position to the operation start point Q1 along a curved route.

The path of this pattern can be determined, for example, in the above mentioned method 11. Specifically, it is sufficient to teach a travel direction ml in a linear travel section M1, a center position K of a circular travel section M2, an incremental travel quantity Δ, and the number of times of incremental movement in the linear travel section M1.

Pattern (d); in this pattern, approach is made extending the path of approach in a spiral manner from the initial position (or, in some cases, an on-route position). The path of this pattern can be determined, for example, in the above mentioned method III. In this method, an initial vector <V1>, a rotation angle $\theta$, and a norm growth factor $\gamma$ are specified as parameters. When calculating an incremental travel quantity Δ of a (i+1)th occurrence (i=0, 1, 2, . . . ), a vector <Vi+1> is determined, based on the last calculated vector <Vi> and the illustrated relationship (rotation of $\theta$ and $\gamma$ times norm), and <Vi+1>−<Vi−> is determined as it 1st incremental amount of movement Δ.

Here, considering the features of the present invention, explanations have been made as to the searching motion path patterns, which includes, in the vicinity of a start point of the operation line, a component of motion having a direction crossing the direction in which the operation line extends. However, the selectable search motion path patterns may include an operation line detection path pattern for approaching in parallel to the direction in which the operation line extends (operation which does not include, in the vicinity of a start point of the operation line, a component of motion having a direction crossing the direction in which the operation line extends).

Further, though an example of welding of a corner portion has been taken for the description of the embodiment, it goes without saying that the present invention is generally applicable to robot/sensor systems to be used for other purposes such as deburring, sealing and the like.

In the method for detecting the position of an operation line by the robot/sensor system according the present invention, the operation for detecting the position of the operation line can be performed not only in a rationalized manner but also, even if positioning of objects of operation is not so accurate, the position of the operation line can be detected with high precision, and intended operation can be started. Further, even if an obstacle or an obstructively-shaped portion, which hinders normal detection of the position of the operation line, exists in the vicinity of an operation start point, possibility of false detection or non-detection can be reduced by selecting the operation line detection path by which such obstacle or obstructive object can be avoided.

What is claimed is:

1. An operation line searching method for a robot/sensor system having a robot, a robot controller and a sensor mounted on said robot for detecting an operation line of an object of operation, so as to perform a predetermined operation by moving a tool supported by said robot along said operation line based on a signal outputted from said sensor, said method comprising:

determining a search motion for finding a position of said operation line using said sensor by moving said tool closer to a predetermined start position of operation, wherein said search motion includes a component of motion in a direction crossing an extending direction of said operation line in the vicinity of said start point of the operation line;

starting said search motion determined in said determination of said search motion; and terminating said search motion when said sensor detects a shaping element of said object of operation during said search motion, said shaping element defining said operation line.

2. An operation line searching method according to claim 1, wherein said determination of said search motion includes selecting one search motion path pattern from a plurality of previously prepared search motion path patterns each having a component of motion in a direction crossing an extending direction of said operation line in the vicinity of the start point of said operation line.

3. An operation line searching method according to claim 2, wherein said determination of said search motion includes determining said search motion based upon directions of coordinate axes of a coordinate system set for said robot.

4. An operation line searching method according to claim 2, wherein said determination of said search motion includes determining said search motion based upon an operation taught to said robot.

5. An operation line searching method according to claim 2, wherein said determination of said search motion includes determining said search motion based upon a predetermined calculation process using path pattern describing parameters set for said robot/sensor system.

6. An operation line searching method according to claim 1, wherein said determination of said search motion includes determining said search motion based upon directions of coordinate axes of a coordinate system set for said robot.

7. An operation line searching method according to claim 1, wherein said determination of said search motion includes determining said search motion based upon an operation taught to said robot.

8. An operation line searching method according to claim 1, wherein said determination of said search motion includes determining said search motion based upon a predetermined calculation process using path pattern describing parameters set for said robot/sensor system.

9. A robot/sensor system having a robot, a robot controller and a sensor mounted on said robot for detecting an operation line of an object of operation, so as to perform a predetermined operation by moving a tool supported by said robot along said operation line based on a signal outputted from said sensor, said system comprising:

search motion determining means for finding a position of said operation line using said sensor by moving said tool closer to a predetermined start position of operation, wherein said search motion includes a component of motion in a direction crossing an extending direction of said operation line in the vicinity of said start point of the operation line;

a motion unit to start said search motion; and means for terminating said search motion when said sensor detects a shaping element of said object of operation during said search motion, wherein said shaping element defines said operation line.

10. A robot/sensor system according to claim 9, wherein said search motion is selected from a plurality of previously prepared search motion path patterns each having a component of motion in a direction crossing an extending direction of said operation line in the vicinity of the start point of said operation line.

11. A robot/sensor system according to claim 10, wherein said search motion is determined based upon directions of coordinate axes of a coordinate system set for said robot.

12. A robot/sensor system according to claim 10, wherein said search motion is determined based upon an operation taught to said robot.

13. A robot/sensor system according to claim 10, wherein to said search motion is determined based upon a predetermined calculation process using path pattern describing parameters set for said robot/sensor system.

14. A robot/sensor system according to claim 9, wherein said 5 search motion is determined based upon directions of coordinate axes of a coordinate system set for said robot.

15. A robot/sensor system according to claim 9, wherein said search motion is determined based upon an operation taught to said robot.

16. A robot/sensor system according to claim 9, Wherein to said search motion is determined based upon a predetermined calculation process using path pattern describing parameters set for said robot/sensor system.

17. An operation line searching method for a robot for detecting an operation line of an object of operation, so as to perform a predetermined operation upon the object, said method comprising:

determining a search motion for finding a position of said operation line by moving a tool attached the robot closer to a predetermined start position of operation, wherein the search motion includes a component of motion in a direction crossing an extending direction of said operation line in the vicinity of said start point of the operation line;

starting said search motion determined in said determination of said search motion; and terminating said search motion when a sensor attached to the robot detects a shaping element defining said operation line.

18. A robot having a sensor for detecting an operation line of an object of operation, so as to perform a predetermined operation on said object by moving a tool supported by said robot along said operation line based on a signal outputted from said sensor, said robot comprising:

a search motion determining unit to derive a position of said operation line, using said sensor, by moving said tool closer to a predetermined start position of operation, wherein the search motion includes a component of motion in a direction crossing an extending direction of said operation line in the vicinity of said start point of the operation line;

a motion unit to start said search motion; and a termination unit to terminate said search motion when said sensor detects a shaping element of said object of operation during said search motion, wherein said shaping element defines said operation line pattern describing parameters set for said robot/sensor system.

* * * * *

UNITED STATES PATENT AND TRADEMARK OFFICE
CERTIFICATE OF CORRECTION

PATENT NO.    : 6,321,139 B1
DATED         : November 20, 2001
INVENTOR(S)   : Akihiro Terada et al.

It is certified that error appears in the above-identified patent and that said Letters Patent is hereby corrected as shown below:

<u>Column 10,</u>
Line 27, after "claim 9," change "Wherein" to -- wherein --.
Lines 64-65, delete "pattern describing parameters set for said robot/sensor system".

Signed and Sealed this

Fourteenth Day of May, 2002

*Attest:*

*Attesting Officer*

JAMES E. ROGAN
*Director of the United States Patent and Trademark Office*